United States Patent
Guillot et al.

[15] 3,665,180
[45] May 23, 1972

[54] METHOD AND APPARATUS FOR MEASURING THE WATER CONTENT OF A SNOWPACK

[72] Inventors: Pierre Guillot; Michel Vuillot, both of Grenoble, France

[73] Assignee: Electricite De France (Service National), Paris, France

[22] Filed: Nov. 25, 1969

[21] Appl. No.: 879,652

[30] Foreign Application Priority Data

Dec. 20, 1968 France....................179,725

[52] U.S. Cl. ...............250/43.5 D, 250/83.3, 250/83.3 D
[51] Int. Cl. ....................G01t 1/17, G01n 23/08
[58] Field of Search.................250/83.5 D, 83.3 D, 83.3

[56] References Cited

UNITED STATES PATENTS 3,432,656  3/1969  Smith et al. ...................250/43.5 D

OTHER PUBLICATIONS

The Hewlett–Packard Instrumentation; 1971; pp. 494–497, 518 & 519

*Primary Examiner*—James W. Lawrence
*Assistant Examiner*—Morton J. Frome
*Attorney*—Lane, Aitken, Dunner & Ziems

[57] ABSTRACT

A device for measuring the water content of a snowpack comprises two vertical tubes respectively locating a standard gamma ray source delivering a horizontal beam and a detector. The source and the detector are moved simultaneously in the respective tubes by a step-by-step motor. Each step occurs after a pre-determined number of pulses has been delivered by the detector so that the time interval between two successive movements is proportional to the water content of the snow layer between two successive movements of the source and detector.

11 Claims, 3 Drawing Figures

INVENTOR
PIERRE GUILLOT &
MICHEL VUILLOT

INVENTOR
PIERRE GUILLOT &
MICHEL VUILLOT

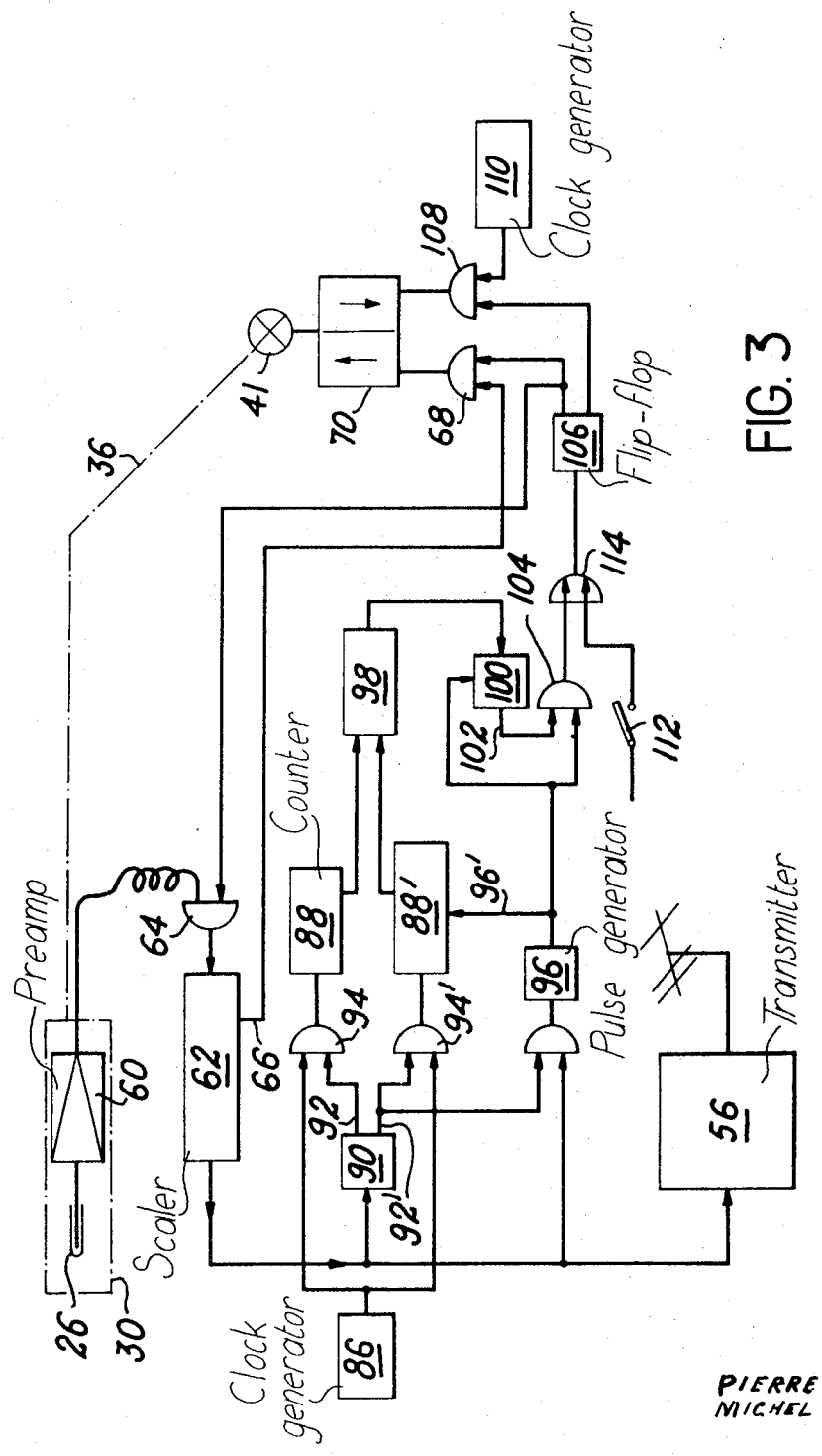

METHOD AND APPARATUS FOR MEASURING THE WATER CONTENT OF A SNOWPACK

This invention relates to the measurement of the water content of a snowpack. It must be understood that the term "-snowpack" as employed hereinafter is intended to include within its meaning the different forms which can be assumed successively by frozen precipitation of this type from the time of deposition of snow to the time of melting.

It has already been proposed to measure the water content of a snowpack by measuring the absorption of gamma radiation by the pack. In particular, there has also been devised for this purpose a system comprising a calibrated gamma-radiation emitter attached to a gantry and a buried counter tube disposed on the same vertical line as said emitter. However, this arrangement is subject to drawbacks. In particular, the height at which the source is placed must clearly be greater than the maximum depth of the snowpack. Should the pack be likely to increase to a depth of several meters, the source must have high radiation strength in order to maintain satisfactory detection sensitivity. However, such a high level of radioactivity is usually considered excessive, the more so as this source always remains in free air. Moreover, although it is possible by means of this arrangement to determine the water content of the snowpack, no indication is given as to the depth of the pack, whereas this is a parameter which it is not only useful but even necessary to determine in many instances.

An object of this invention is to provide a simple and accurate method and device for determining the water content of a snowpack by measuring the absorption of gamma radiation by the pack.

Another object of the invention is to permit the use of a source which has low intensity and also which emerges from the snowpack only for short periods of time.

A better understanding of the invention will be obtained from the following description of one embodiment which is given solely by way of example without any limitation being implied, reference being made to the accompanying drawings, wherein:

FIG. 3 is a block diagram showing the general arrangement of an electronic system for counting, programming and control which can be associated with the device of FIGS. 1 and 2 for controlling the operations of variable-speed displacement, counting and transmission of measurements.

Figure 1:
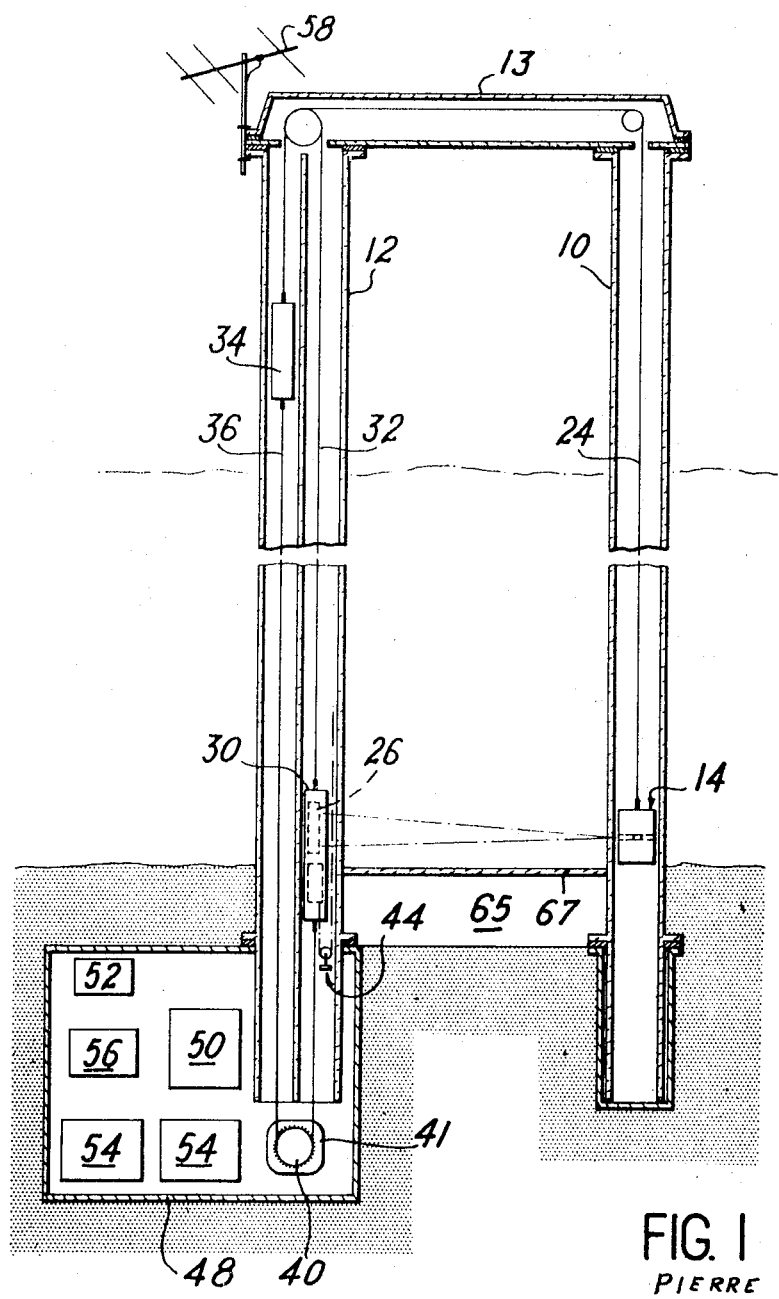
FIG. 1 is a very diagrammatic view in elevation showing the mechanical portions of the device and representing the associated supply and electronic circuitry.

The stationary components of the device which is illustrated in FIG. 1 take the form of a gantry which is made up of two vertical access tubes 10 and 12 and of a hollow connecting cross-member 13 placed at a height to be above the deepest expected snow and secured to the access tubes by means of sealing joints. The access tubes are formed of a material having low heat conductivity (such as synthetic resin reinforced with glass fibers, for example), said material being painted in a bright color in order to reduce the absorption of solar radiation and cooling during the night.

Figure 2:
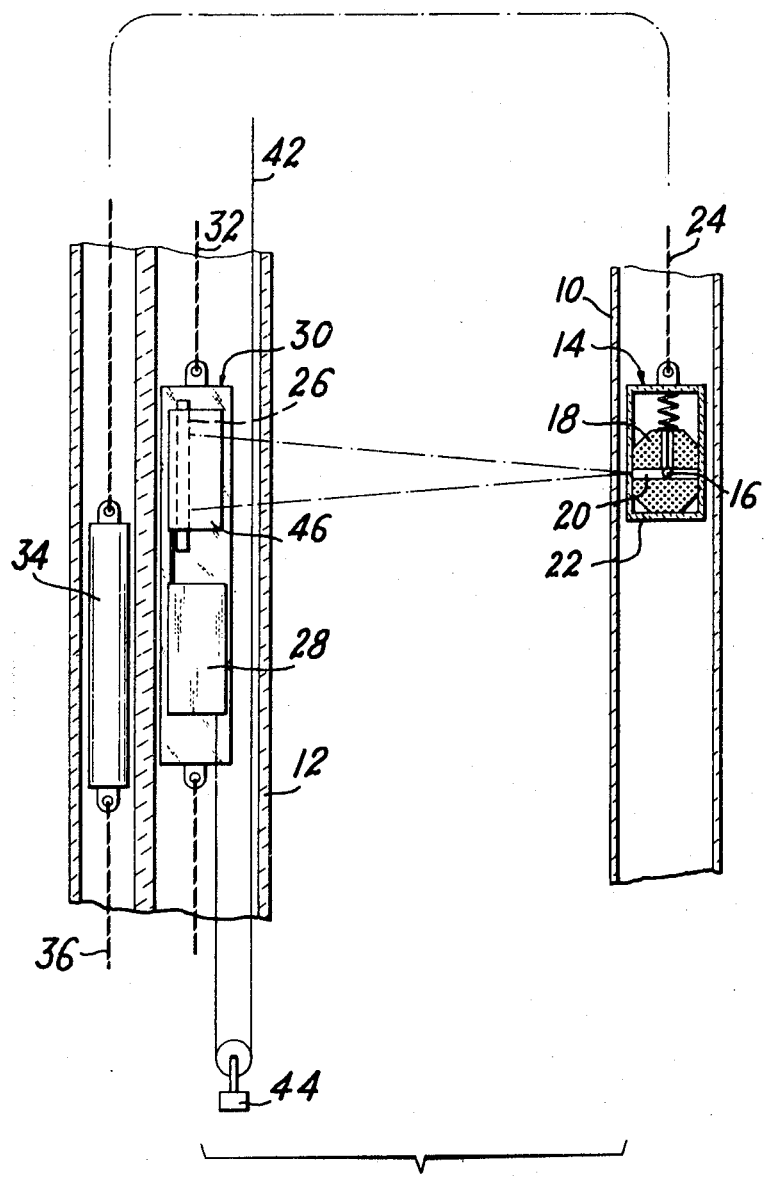
FIG. 2 is a detail view in elevation and on a larger scale showing the gamma source and the detector of the device of FIG. 1.

A gamma-radiation source 14 which is illustrated in FIG. 2 is intended to be displaced within the interior of the access tube 10 which has a circular cross-section. Said source consists of a capsule 16 which is formed of a gamma-radiation emitter such as cesium-137 and placed inside a lead container 18 which has an approximately spherical shape, a slit 20 having a width of a few millimeters (4 mm, for example) being formed in the horizontal mid-plane of said container so as to form a flattened beam of gamma rays. This arrangement makes it possible to regulate the intensity of the emitted gamma radiation by lowering the capsule 16 to a greater or lesser extent with respect to the central slit 20. The container is enclosed within a casing 22 of plastic material, for example, which is capable of sliding within the interior of the access tube 10. The casing is suspended from a stainless steel tape 24 which controls the vertical displacements of the source 14.

The level of activity or radiation strength with which the source 14 is endowed evidently depends to an appreciable extent on the distance between the two access tubes 10 and 12, this distance being in turn chosen so as to have a sufficiently high ratio between the intensities received by the detector in free air and after absorption by the heavy snow, the density of which is of the order of 0.5. A distance of 60 cm provides an acceptable ratio of the order of 4.5 when the source is cesium-137 and leads to the use of a source containing an activity of the order of 30 mc.

The detector assembly which is illustrated in FIGS. 1 and 2 comprises a Geiger-Muller counter tube 26 which is preferable to a scintillation counter. Said tube 26 together with its high-voltage supply 28 is enclosed in a casing 30, said casing being suspended from a steel tape 32 and thus displaced in vertical motion within one of the compartments of rectangular cross-section which are provided within the access tube 12. A counter-weight 34 is capable of displacement within the other compartment of said access tube and serves to balance the casings 22 and 30; the steel tape 32 provides a connection between the top of the casing 30 and the top of the counter-weight 34 and passes over a fixed guide pulley 38 while another steel tape 36 provides a connection between the lower ends of the casing 30 and counter-weight 34 and passes over a studded driving wheel 40. The tape 24 which serves to displace the source connects the top of the counter-weight 34 to the top of the casing 22 so that the source 14 and the detector 20 always remain substantially at the same level during their simultaneous displacements.

The studded wheel 40 is driven by a motor 41 (FIGS. 1 and 3). Said motor is of the reversible stepping type. There can advantageously be employed a contactless magnetic-locking motor which is of rugged design, has low current consumption, permits a low-voltage power supply and does not exhibit drift. This motor can be controlled by an electronic switch having two inputs which control respectively the upward motion and downward motion of the source and of the detector.

The pulses delivered by the counter tube 26 are shaped by means of an electronic system contained within the casing 30, then transmitted to an electronic counting and control system by means of a cable 42 which is tensioned by means of a counter-weight 44 (as shown in FIG. 2).

A potential cause of error evidently lies in the fact that the gamma radiation which reaches the counter tube 26 comprises not only a direct fraction (which is attenuated by passage through the snow) but also a substantial fraction of radiation which has been scattered as a result of the Compton effect. In consequence, the variation of radiation as a function of the snow density is smaller than if only direct radiation were received. A number of expedients are open to selection for improving the detection sensitivity. In particular, and as illustrated in FIG. 2, the counter tube 26 can be protected from the scattered radiation by a lead shield 46 having a thickness of a few millimeters (5 mm) and having the shape of a U which is open towards the source 14. Moreover, it is an advantage to employ a source which emits relatively soft gamma radiation in order to increase the attenuation to which it is subjected. Preference is accordingly given to the use of cesium-137 rather than cobalt-60, both for this reason as well as the fact that cesium-137 has a longer half-life.

A waterproof housing 48 which is buried below ground at the foot of the access tube 12 contains the electronic counting and control system 50, a clock pulse generator 52 which initiates a sequence of measurements at uniform time intervals and a direct-current source such as a dry-cell unit 54. In addition, the device which is illustrated in FIG. 1 comprises a radio transmitter 56 which supplies an antenna 58 for the transmission of measured data to distant locations.

The electronic system which is illustrated diagrammatically in FIG. 3 performs a number of different functions which will now be described in turn. In particular, this system initiates the following operations:

the emission of a signal each time N pulses have been produced by the detector (and therefore each time the detector has moved over a distance corresponding to the thickness of one horizontal layer of the snowpack, or so-called profile interval);

the rotation of the motor by one step each time $n$ pulses have been produced by the detector;

the reversal of the direction of the motor and the return of the source and detector to the rest position as soon as they pass out of the pack above the snow surface or finally actuate an electric end-of-travel stop.

In FIG. 3, the casing 30 of the detector and the steel tape 36 which provides a coupling between the casing and the motor 41 are shown diagrammatically in chain-dotted lines whereas the electric or logic circuit connections are shown in full lines.

The pulses emitted by the counter tube 26 which constitutes the detector are shaped in a preamplifier 60, then applied to the input of a scaler 62 via an AND circuit 64, the intended function of which will become apparent hereinafter. The scaler counts the applied pulses and each time the scaler counts to its capacity of N, the said scaler delivers an output signal which is applied to the remote-transmission emitter assembly 56 which need not be described here since it can be of conventional design and has the sole purpose of delivering one pulse at each filling of the scaler 62.

The scaler 62 also constitutes a divider in which the input frequency is divided by a whole number $n$ (wherein $n$ is a submultiple of N or is equal to N) and thus produces one pulse on a second output 66 each time it has received $n$ input pulses. These pulses are applied to one of the inputs of an AND circuit 68 for supplying the "UP" input of the electronic switch 70 which controls the motor 41. As a result, and for as long a period of time as the other input of the AND circuit 68 remains supplied by an assembly which will be described later and produces the reversal of the direction of rotation of the motor 41, each pulse which appears on the output 66 causes the motor 41 to advance by one step in a direction corresponding to the upward motion of the detector and of the source 14.

The assembly which serves to reverse the direction of rotation of the motor and to return the source and detector to the rest position makes use of a comparison between the time $\tau$ of vertical travel across a compartment 65 which contains no snow and forms a calibration interval and the time interval $t$ of travel across a snow-profile distance interval of identical value, so that a reversal takes place when $t$ becomes either equal to or smaller than $\tau$. The determination of $\tau$ must obviously be made at the start of the measurement sequence. The compartment 65, the depth of which is slightly greater than the profile interval which corresponds to the emission of N pulses, is delimited by a horizontal casing which is placed between the access tubes and the top wall 67 of which is located at ground level. The position of rest of the source and detector is governed by a bottom-limit switch (not shown in the drawings) which is located at a distance from the wall 67 which is equal to one profile interval. Thus, at the time of start-up of the device, the beam of gamma rays traverses the air contained within the compartment close to the bottom of the compartment.

The measurement of the time intervals $t$ and $\tau$ as well as the storage of a representation of $\tau$ are carried out by a circuit comprising a time-base or clock generator 86 which is connected by means of a switching circuit either to a first counter 88 (measurement of $\tau$) or to a second counter 88' (measurement of $t$). The switching circuit which is illustrated is constituted by a bistable device or flip-flop 90 having two inputs, only one of which is employed in order that said flip-flop should change state only once at the end of the time interval $\tau$, and having two outputs 92 and 92' which supply respectively AND circuits 94 and 94'. The second inputs of the circuits 94 AND 94' are connected to the clock generator 86 while the outputs are respectively connected to the counters 88 and 88'.

The counter 88' alone is provided with a reset input 96' which is triggered at each filling of the scaler 62 by an assembly comprising a pulse generator 96. This output pulse is applied to the input 96' of the counter 88' in order to clear the counter 88' to zero. Since the counter 88 is not provided with a zero reset, said counter counts the number of pulses supplied thereto from the clock generator while the logic level 1 is present on the output 92 of the flip-flop 90, said number of pulses being representative of the time interval $\tau$; the storage operation of this count in counter 88 lasts until the interruption of the supply at the end of a complete measurement sequence (namely after scanning of the entire snowpack profile).

A comparison between $\tau$ and $t$ on completion of each profile interval scan corresponding to the emission of N pulses is made by an anticoincidence circuit 98 ("exclusive OR" circuit) which controls a two-input gate flip-flop 100. Thus, the circuit 98 produces a coincidence pulse when the two counters 88 and 88' register the same count say at the time $\tau$. If this pulse is produced, then $t > \tau$, the flip-flop 100 is caused to change state, whereupon the output 102 of this latter is connected to an AND circuit 104 which is then cut-off. The pulse produced by the generator 96 cannot be transmitted but returns the flip-flop 100 to its initial state, that is to say, restores the logic level 1 on the output 102. On the other hand, if a pulse is produced by the generator 96 whereas no signal has been applied to the flip-flop 100 by the circuit 98, the AND circuit transmits the pulse to a flip-flop 106 which flips, no longer enables the upward-motion AND circuit 68 and begins to enable the AND circuit 108. From this moment, each pulse produced by a high-frequency clock generator 110 causes the step-by-step rotary displacement of the motor at constant speed in a direction corresponding to the downward motion of the detector 26 and of the source 14.

At the same time, the output AND circuit 64 of the preamplifier stops transmitting the pulses which are delivered from the detector.

Provision is also made for safety feature which consists of an end-of-travel stop for reversing the direction of rotation of the motor and returning the source 14 and detector 26 to the rest position in the event of failure of the system which has just been described. As shown in FIG. 3, said stop can consist of a simple flexible-strip switch 112 connected on the one hand to a supply source which has not been illustrated and on the other hand to one of the inputs of an OR circuit 114 which is interposed between the output of the AND circuit 104 and the flip-flop 106. Closure of the switch 112 initiates the reversal of the flip-flop and the actuation of the electronic switch 70 by the clock generator 110 in the direction corresponding to downward motion. The switch 112 can be placed within a sealed container and actuated by a magnet secured to the tape from which the detector casing is suspended.

The characteristics of an apparatus which has actually been constructed can be given by way of example as follows: the scaler 62 has a capacity of 3,840 and the output 66 produces one pulse for 16 input pulses. The single-step angular displacement of the motor 41 is chosen so that the filling of the scaler 62 should correspond to a displacement of the source 14 and detector 26 over a distance of 10 centimeters. In the case of a 30 mc cesium-137 source, said displacement over a distance of 10 centimeters is carried out in a time interval $t_0$ of the order of 4.5 secs in air and in a time interval $t$ of the order of 6 secs in light snow having a density of 0.1 and over a period of 20 secs in heavy snow having a density of 0.5. The repetition frequencies of the clock generators 86 and 110 are respectively 5 c/s and 100 c/s.

The operation of the device from the rest position will already have become clear from the foregoing description and will therefore be explained only in brief outline so far as concerns its essential stages. When the clock pulse generator 52 initiates the operation of the device, said generator ensures the application of the different power supplies, trips the relay controlled by the limit switch which was previously actuated as a result of the return of the source 14 and detector 26 to their rest positions. Under initial conditions, the flip-flop 90 produces a logic signal 1 on the output 92, the counters 88 and 88' are vacant register zero, the flip-flop 106 supplies enables the AND circuit 68.

The pulses produced by the detector 26 cause the progressive upward motion of the source 14 and the detector 26 under the action of the motor 41 which is actuated in step-by-step motion. The source 14 thus travels over the distance between its rest position and the top of the compartment 65 in a time interval $\tau$ which corresponds to filling of the scaler 62. This time interval $to$ is indicated by the number of pulses derived from the clock generator 86 and stored in the counter 88. The pulse produced by the scaler 62 at the instant at which the Nth pulse is applied thereto causes a reversal of state of the flip-flop 90 which will subsequently produce a logic signal 1 on its output 92' until completion of the measurement sequence. At the same time, the output pulse of the scaler 62 produces a time signal which is transmitted by the transmitter 56 to a receiving station placed at a distant location and associated with a recording unit.

Postulating that the following profile interval or layer which is scanned by the device contains snow, the corresponding transit time interval $t$ will be longer than $\tau$. The generator 96 produces one pulse at the end of each time $t$ since the inputs of the AND circuit which controls said generator are then supplied in one case continuously via the flip-flop 90 and in the other case at the instant at the end of each interval $t$ via the scaler 62. Since $\tau < t$, the output 102 of the flip-flop 100 cuts-off the circuit 104 from the instant following the interval $t$ at the end of each interval $t$. The pulse produced by the generator 96 is not transmitted to the flip-flop 106 and the pulses delivered from the output 66 are transmitted to the input of the electronic switch corresponding to upward motion. The pulse produced by the generator 96 only serves to return the flip-flop 100 to its initial state and to reset the counter 88' at the instant at which a time signal is delivered by the transmitter 56.

The source 14 and the detector 26 thus carry out a profile run through the snowpack. When they have passed through the top layer which is located above the surface of the snow referred-$\tau$, the corresponding time interval $t'$ will be either equal to or even smaller than $\tau$. Under these conditions, the flip-flop 100 will not yet be caused to change state by the anticoincidence circuit 98 when the pulse is emitted by the generator 96 at the end of the time interval $t'$. This pulse is therefore transmitted by the AND circuit 104 to the flip-flop 106 which changes state and supplies the AND circuit 108 instead of the circuit 68. From this moment, the motor 41 will carry out a one-step rotation in the direction corresponding to downward motion each time it receives a pulse from the sweep generator 110. This motion will continue until the source or the detector opens a bottom-limit switch (not shown in the drawings) which cuts off the power supplies.

It is apparent that the device will deliver successively a time signal corresponding to each profile interval, namely the vertical distance of travel through each snow layer. The periods of time which are necessary for displacement through each profile interval are directly proportional to the water content of the snow within that profile interval and a simple addition will give the total water content. Moreover, since the value of each profile interval is known, the depth of the snowpack may be deduced directly from the number of time signals emitted by means of a simple multiplication. The absolute precision of measurement of the density of the snow layer corresponding to each profile interval and which is proportional to $N^{-0.5}$ remains constant throughout the measurement operation since the number N of pulses emitted by the detector in respect of each scanned profile interval is constant. As a result, the device makes it possible to minimize the number of data-transmission signals, the necessary power consumption and consequently the capital cost for a given degree of precision. The measurement which is made in free air provides a reference which makes it possible to check the calibration. All these advantages are secured by employing only logic circuits which can be integrated circuits having low power consumption.

Modifications can obviously be made to the embodiment which has been described for illustrating the invention without departing from the spirit thereof: for instance a detector other than a GM counter may be used. It should be understood that such modifications are covered as long as they fall within the scope of the claims.

We claim:

1. A method of measurement of the water content of a snow pack, comprising displacing a radioactive source and a gamma-radiation detector simultaneously along vertical passageways formed within the snowpack and deducing the water content of the snowpack at a number of different levels from the intensities of the radiation measured by the detector at said levels, wherein the improvement comprises displacing the source and the detector at a mean rate which is variable and proportional to the intensity measured at each level.

2. A method according to claim 1, wherein the source and detector are displaced by steps, all steps being equal and each displacement occuring after a pre-determined number $n$ of pulses has been emitted by the detector since the preceding displacement.

3. A method according to claim 2, wherein time intervals are defined each corresponding to the emission by the detector of a given number N of pulses which is equal to $n$ or a multiple thereof and to the scanning of a layer of pre-determined thickness of the snowpack measured, each of said time intervals being representative of the water content of the corresponding snow layer.

4. A device for measuring the water content of a snow pack, comprising: two stationary vertical tubes; a gamma ray source of pre-determined activity; means vertically movable within one of the tubes and emitting a gamma ray beam in a substantial horizontal plane; a radiation detector vertically movable within the other tube; means for moving the detector and the source simultaneously within the two tubes and maintaining them at the same level, and means for controlling said motor and moving said source and said detector at a speed which is proportional to the intensity measured by the detector.

5. A device according to claim 4, wherein the motor which serves to actuate the source and the detector is of the step-by-step type and the control means causes a one-step rotation of the motor each time the detector has emitted a given number $n$ of pulses.

6. A device according to claim 5, wherein the motor is of the reversible step-by-step and contactless magnetic-locking type.

7. A device according to claim 4 comprising a dividing circuit which is supplied by the detector and delivers a drive pulse to the motor at intervals corresponding to $n$ pulses.

8. A device according to claim 5 comprising a scaler which is supplied by the detector, said scaler having a capacity N which is a multiple of $n$ or which is equal to $n$ and delivers a time-measurement pulse at each filling of said scaler.

9. A device according to claim 4 comprising an empty horizontal compartment which is placed between the access tubes and the top face of which is level with the ground, the rest position of the source and of the detector being located at a distance from the top wall of said compartment which is equal to the thickness of one of said layers.

10. A device according to claim 9 comprising means for automatically stopping the motor and reversing the displacement of said motor until the source and the detector have returned to their position of rest, said means being actuated when within a given measurement layer the time $t$ for counting N pulses is shorter than the time $to$ for counting the same number of pulses at the level of said compartment.

11. A device according to claim 10 comprising a clock generator, two counters, a circuit which switches the output of the clock generator to the first counter during the time interval $to$ then to the second counter during each successive time interval $t$ and means for reversing the movement of the motor at the instant at which the detector and the source pass through a layer corresponding to N pulses in a time interval $t$ which is shorter than or equal to $t_0$.

* * * * *

UNITED STATES PATENT OFFICE
CERTIFICATE OF CORRECTION

Patent No. 3,665,180  Dated May 23, 1972

Inventor(s) Pierre Guillot and Michel Vuillot

It is certified that error appears in the above-identified patent and that said Letters Patent are hereby corrected as shown below:

Column 4, line 8, cancel --operation--.

Column 4, line 17, after "same count" insert --, that is to--.

Column 4, line 60, change "to" to --τ--.

Column 5, line 2, cancel "are vacant".

Column 5, line 2, cancel "supplies".

Column 5, line 10, change "to" to --τ--.

Column 5, line 29, cancel "from the instant".

Column 5, change "t" to --τ--.

Column 5, lines 41 thru 45, "Under these conditions, the flip-flop 100 will not yet be caused to change state by tne anticoincidence circuit 98 when the pulse is emitted by the generator 96 at the end of the time interval t'." should be typed in regular print instead of italics.

Column 6, claim 10, line 69, change "to" to --τ--.

Column 6, claim 11, line 74, change "to" to --τ--.

Column 7, claim 11, line 3, change "to" to --τ--.

Signed and sealed this 28th day of November 1972.

(SEAL)
Attest:

EDWARD M. FLETCHER, JR.
Attesting Officer

ROBERT GOTTSCHALK
Commissioner of Patents